US012725260B2

(12) United States Patent
Mei et al.

(10) Patent No.: US 12,725,260 B2
(45) Date of Patent: Sep. 1, 2026

(54) GENERATING PANOPTIC SEGMENTATION LABELS

(71) Applicant: Waymo LLC, Mountain View, CA (US)

(72) Inventors: Jieru Mei, Baltimore, MD (US); Hang Yan, Sunnyvale, CA (US); Liang-Chieh Chen, Los Angeles, CA (US); Siyuan Qiao, Santa Clara, CA (US); Yukun Zhu, Shoreline, WA (US); Alex Zihao Zhu, Mountain View, CA (US); Xinchen Yan, San Francisco, CA (US); Henrik Kretzschmar, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 150 days.

(21) Appl. No.: 18/118,705

(22) Filed: Mar. 7, 2023

(65) Prior Publication Data

US 2023/0281824 A1 Sep. 7, 2023

Related U.S. Application Data

(60) Provisional application No. 63/317,534, filed on Mar. 7, 2022.

(51) Int. Cl.
*G06T 7/11* (2017.01)
*G01S 17/89* (2020.01)
(Continued)

(52) U.S. Cl.
CPC ................ *G06T 7/11* (2017.01); *G01S 17/89* (2013.01); *G06V 10/82* (2022.01); *G06V 20/58* (2022.01);
(Continued)

(58) Field of Classification Search
CPC ............ G06T 7/11; G06T 2207/10016; G06T 2207/10028; G06T 2207/20081;
(Continued)

(56) References Cited

U.S. PATENT DOCUMENTS

2018/0314921 A1* 11/2018 Mercep .................. G01S 15/86
2019/0197778 A1* 6/2019 Sachdeva ............. G06F 18/251
(Continued)

OTHER PUBLICATIONS

Li, Peiliang, and Tong Qin. “Stereo vision-based semantic 3d object and ego-motion tracking for autonomous driving.” Proceedings of the European Conference on Computer Vision (ECCV). 2018. (Year: 2018).*

(Continued)

*Primary Examiner* — Karl Duc Truong
(74) *Attorney, Agent, or Firm* — Fish & Richardson P.C.

(57) ABSTRACT

Methods, systems, and apparatus for generating a panoptic segmentation label for a sensor data sample. In one aspect, a system comprises one or more computers configured to obtain a sensor data sample characterizing a scene in an environment. The one or more computers obtain a 3D bounding box annotation at each time point for a point cloud characterizing the scene at the time point. The one or more computers obtain, for each camera image and each time point, annotation data identifying object instances depicted in the camera image, and the one or more computers generate a panoptic segmentation label for the sensor data sample characterizing the scene in the environment.

20 Claims, 4 Drawing Sheets

(51) Int. Cl.
*G06V 10/82* (2022.01)
*G06V 20/58* (2022.01)
*G06V 20/64* (2022.01)

(52) U.S. Cl.
CPC .... *G06V 20/64* (2022.01); *G06T 2207/10016* (2013.01); *G06T 2207/10028* (2013.01); *G06T 2207/20081* (2013.01); *G06T 2207/30252* (2013.01); *G06T 2210/12* (2013.01)

(58) Field of Classification Search
CPC ....... G06T 2207/30252; G06T 2210/12; G06T 2207/20084; G01S 17/89; G01S 7/4802; G01S 17/86; G01S 17/931; G06V 10/82; G06V 20/58; G06V 20/64; G06V 10/25; G06V 20/70
See application file for complete search history.

(56) References Cited

U.S. PATENT DOCUMENTS

| | | | | |
|---|---|---|---|---|
| 2021/0150230 A1* | 5/2021 | Smolyanskiy | ......... | G06V 10/82 |
| 2021/0181758 A1* | 6/2021 | Das | ......... | G06F 18/25 |
| 2022/0237799 A1* | 7/2022 | Price | ......... | G06T 7/174 |
| 2022/0284666 A1* | 9/2022 | Chandler | ......... | G06N 5/00 |
| 2023/0252638 A1* | 8/2023 | Hotson | ......... | G06V 10/7747 382/157 |
| 2023/0267615 A1* | 8/2023 | Agia | ......... | G01S 17/42 345/419 |

OTHER PUBLICATIONS

Khan, Sohaib, and Mubarak Shah. "Consistent labeling of tracked objects in multiple cameras with overlapping fields of view." IEEE transactions on pattern analysis and machine intelligence 25.10 (2003): 1355-1360. (Year: 2003).*
Simon, Martin, et al. "Complexer-yolo: Real-time 3d object detection and tracking on semantic point clouds." Proceedings of the IEEE/CVF conference on computer vision and pattern recognition workshops. 2019. (Year: 2019).*
Baque et al., "Deep occlusion reasoning for multi-camera multitarget detection," Proceedings of the IEEE International Conference on Computer Vision (ICCV), 2017, pp. 271-279.
Behley et al., "SemanticKITTI: A dataset for semantic scene understanding of lidar sequences," Proceedings of the IEEE/CVF International Conference on Computer Vision (ICCV), 2019, pp. 9297-9307.
Berclaz et al., "Multiple object tracking using k-shortest paths optimization," IEEE Transactions on Pattern Analysis and Machine Intelligence, Sep. 2011, 33(9):1806-1819.
Brostow et al., "Semantic object classes in video: A high definition ground truth database," Pattern Recognition Letters, Jan. 15, 2009, 30(2):88-97.
Caesar et al., "nuScenes: A multimodal dataset for autonomous driving," Proceedings of the IEEE/CVF Conference on Computer Vision and Pattern Recognition (CVPR), 2020, pp. 11621-11631.
Chang et al., "Argoverse: 3D tracking and forecasting with rich maps," Proceedings of the IEEE/CVF Conference on Computer Vision and Pattern Recognition (CVPR), 2019, pp. 8748-8757.
Chavdarova et al., "Wildtrack: A multi-camera HD dataset for dense unscripted pedestrian detection," Proceedings of the IEEE Conference on Computer Vision and Pattern Recognition (CVPR), 2018, pp. 5030-5039.
Chen et al., "DeepLab: Semantic image segmentation with deep convolutional nets, atrous convolution, and fully connected CRFs," IEEE Transactions on Pattern Analysis and Machine Intelligence, Apr. 1, 2018, 40(4):834-848.
Chen et al., "Encoder-decoder with atrous separable convolution for semantic image segmentation," Proceedings of the European Conference on Computer Vision (ECCV), 2018, pp. 801-818.
Chen et al., "Geosim: Realistic video simulation via geometry-aware composition for self-driving," Proceedings of the IEEE/CVF Conference on Computer Vision and Pattern Recognition (CVPR), 2021, pp. 7230-7240.
Chen et al., "Semantic image segmentation with deep convolutional nets and fully connected CRFs," CoRR, Dec. 2014, arxiv.org/abs/1412.7062, 14 pages.
Cheng et al., "Panoptic-Deeplab: A simple, strong, and fast baseline for bottom-up panoptic segmentation," Proceedings of the IEEE/CVF Conference on Computer Vision and Pattern Recognition (CVPR), 2020, pp. 12475-12485.
Cheng et al., "Segow: Joint learning for video object segmentation and optical Flow," Proceedings of the IEEE International Conference on Computer Vision (ICCV), 2017, pp. 686-695.
Cordts et al., "The Cityscapes Dataset for Semantic Urban Scene Understanding," Proceedings of the IEEE Conference on Computer Vision and Pattern Recognition (CVPR), 2016, pp. 3213-3223.
Dehghan et al., "GMMCP Tracker: Globally optimal generalized maximum multi clique problem for multiple object tracking," Proceedings of the IEEE Conference on Computer Vision and Pattern Recognition (CVPR), 2015, pp. 4091-4099.
Dendorfer et al., "MOTChallenge: A Benchmark for Single-camera Multiple Target Tracking," International Journal of Computer Vision, Dec. 23, 2020, 129:845-881.
Eigen et al., "Depth map prediction from a single image using a multi-scale deep network," Advances in Neural Information Processing Systems 27, 2014, 9 pages.
Eshel et al., "Homography based multiple camera detection and tracking of people in a dense crowd," 2008 IEEE Conference on Computer Vision and Pattern Recognition, Jun. 23-28, 2008, 8 pages.
Ettinger et al., "Large scale interactive motion forecasting for autonomous driving: The waymo open motion dataset," Proceedings of the IEEE/CVF International Conference on Computer Vision (ICCV), 2021, pp. 9710-9719.
Everingham et al., "The Pascal Visual Object Classes (VOC) Challenge," IJCV, Sep. 9, 2009, 88:303-338.
Felzenszwalb et al., "Efficient graph-based image segmentation," IJCV, Sep. 2004, 59:167-181.
Ferryman et al., "Pets2009: Dataset and Challenge," 2009 Twelfth IEEE international workshop on performance evaluation of tracking and surveillance, Dec. 7-9, 2009, 6 pages.
Fleuret et al., "Multicamera people tracking with a probabilistic occupancy map," IEEE Transactions on Pattern Analysis and Machine Intelligence, Feb. 2008, 30(2):267-282.
Gao et al., "SSAP: Single-Shot Instance Segmentation With A nity Pyramid," Proceedings of the IEEE/CVF International Conference on Computer Vision (ICCV), 2019, pp. 642-651.
Geiger et al., "Are we ready for autonomous driving? the kitti vision benchmark suite," 2012 IEEE Conference on Computer Vision and Pattern Recognition, Jun. 16-21, 2012, pp. 3354-3361.
Han et al., "MMPTRACK: Large-scale densely annotated multi-camera multiple people tracking benchmark," Proceedings of the IEEE/CVF Winter Conference on Applications of Computer Vision (WACV), 2023, pp. 4860-4869.
Hariharan et al., "Simultaneous detection and segmentation," Computer Vision—ECCV 2014, 2014, pp. 297-312.
He et al., "Deep residual learning for image recognition," Proceedings of the IEEE Conference on Computer Vision and Pattern Recognition (CVPR), 2016, pp. 770-778.
He et al., "Multiscale conditional random elds for image labeling," Proceedings of the 2004 IEEE Computer Society Conference on Computer Vision and Pattern Recognition, Jun. 27, 2004, 8 pages.
Hofmann et al., "Hypergraphs for joint multi-view reconstruction and multi-object tracking," Proceedings of the IEEE Conference on Computer Vision and Pattern Recognition (CVPR), 2013, pp. 3650-3657.
Huang et al., "The ApolloScape open dataset for autonomous driving and its application," IEEE Transactions on Pattern Analysis and Machine Intelligence, Oct. 1, 2020, 42(10)2702-2719.

(56) References Cited

OTHER PUBLICATIONS

Kendall et al., "Multi-task learning using uncertainty to weigh losses for scene geometry and semantics," Proceedings of the IEEE Conference on Computer Vision and Pattern Recognition (CVPR), 2018, pp. 7482-7491.
Kim et al., "Video Panoptic Segmentation," Proceedings of the IEEE/CVF Conference on Computer Vision and Pattern Recognition (CVPR), 2020, pp. 9859-9868.
Kingma et al., "Adam: A method for stochastic optimization," CoRR, Dec. 22, 2014, arxiv.org/abs/1412.6980, 15 pages.
Kirillov et al., "Panoptic Feature Pyramid Networks," Proceedings of the IEEE/CVF Conference on Computer Vision and Pattern Recognition (CVPR), 2019, pp. 6399-6408.
Kirillov et al., "Panoptic Segmentation," Proceedings of the IEEE/CVF Conference on Computer Vision and Pattern Recognition (CVPR), 2019, pp. 9404-9413.
Kretzschmar et al., "Scalability in Perception for autonomous driving: Waymo Open Dataset," Proceedings of the IEEE/CVF Conference on Computer Vision and Pattern Recognition (CVPR), 2020, pp. 2446-2454.
Kuo et al., "Inter-camera association of multi-target tracks by on-line learned appearance a nity models," Computer Vision—ECCV 2010, Sep. 2010, 6311:383-396.
Ladicky et al., "What, where and how many? combining object detectors and CRFs," Computer Vision—ECCV 2010, Sep. 2010, 6314:424-437.
Li et al., "Attention-guided unifed network for panoptic segmentation," Proceedings of the IEEE/CVF Conference on Computer Vision and Pattern Recognition (CVPR), 2019, pp. 7026-7035.
Liang et al., "Polytransform: Deep polygon transformer for instance segmentation," Proceedings of the IEEE/CVF Conference on Computer Vision and Pattern Recognition (CVPR), 2020, pp. 9131-9140.
Liao et al., "Kitti-360: A novel dataset and benchmarks for urban scene understanding in 2D and 3D," CoRR, Sep. 28, 2021, arxiv.org/abs/2109.13410, 32 pages.
Lin et al., "Microsoft COCO: common objects in context," Computer Vision—ECCV 2010, Sep. 2014, 8693:740-755.
Ling et al., "Variational amodal object completion," Advances in Neural Information Processing Systems, 2020, 33:16246-57.
Liu et al., "An End-to-End Network for Panoptic Segmentation," Proceedings of the IEEE/CVF Conference on Computer Vision and Pattern Recognition (CVPR), 2019, pp. 6172-6181.
Long et al., "Fully convolutional networks for semantic segmentation," Proceedings of the IEEE Conference on Computer Vision and Pattern Recognition (CVPR), 2015, pp. 3431-3440.
Luiten et al., "HOTA: A Higher Order Metric for Evaluating Multi-Object Tracking," IJCV, Oct. 8, 2020, 129:548-578.
Mallya et al., "World-consistent video-to-video synthesis," Computer Vision—ECCV 2020, Nov. 2020, 12353:359-378.
Miao et al., "VSPW: A large-scale dataset for video scene parsing in the wild," Proceedings of the IEEE/CVF Conference on Computer Vision and Pattern Recognition (CVPR), 2021, pp. 4133-4143.
Neuhold et al., "The mapillary vistas dataset for semantic understanding of street scenes," Proceedings of the IEEE International Conference on Computer Vision (ICCV), 2017, pp. 4990-4999.
Papandreou et al., "PersonLab: Person pose estimation and instance segmentation with a bottom-up, part-based, geometric embedding model," Proceedings of the European Conference on Computer Vision (ECCV), 2018, pp. 269-286.
Philion et al., "Lift, splat, shoot: Encoding images from arbitrary camera rigs by implicitly unprojecting to 3D," Computer Vision—ECCV 2020, Nov. 13, 2020, pp. 194-210.
Porzi et al., "Seamless Scene Segmentation," Proceedings of the IEEE/CVF Conference on Computer Vision and Pattern Recognition (CVPR), 2019, pp. 8277-8286.
Qi et al., "Offboard 3D object detection from point cloud sequences," Proceedings of the IEEE/CVF Conference on Computer Vision and Pattern Recognition (CVPR), 2021, pp. 6134-6144.
Qiao et al., "VIP-Deeplab: Learning visual perception with depth-aware video panoptic segmentation," Proceedings of the IEEE/CVF Conference on Computer Vision and Pattern Recognition (CVPR), 2021, pp. 3997-4008.
Ristani et al., "Features for multi-target multi-camera tracking and re-identification," Proceedings of the IEEE Conference on Computer Vision and Pattern Recognition (CVPR), 2018, pp. 6036-6046.
Ristani et al., "Performance measures and a data set for multi-target, multi-camera tracking," Computer Vision—ECCV 2016 Workshops, Nov. 3, 2016, pp. 17-35.
Roddick et al., "Predicting semantic map representations from images using pyramid occupancy networks," Proceedings of the IEEE/CVF Conference on Computer Vision and Pattern Recognition (CVPR), 2020, pp. 11138-11147.
Russakovsky et al., "ImageNet Large Scale Visual Recognition Challenge," International Journal of Computer Vision, Apr. 11, 2015, 115:211-252.
Shi et al., "Normalized cuts and image segmentation," IEEE Transactions on Pattern Analysis and Machine Intelligence, Aug. 2000, 22(8):888-905.
Song et al., "Im2pano3d: Extrapolating 360 structure and semantics beyond the eld of view," Proceedings of the IEEE Conference on Computer Vision and Pattern Recognition (CVPR), 2018, pp. 3847-3856.
Tang et al., "CityFlow: A city-scale benchmark for multi-target multi-camera vehicle tracking and re-identification," Proceedings of the IEEE/CVF Conference on Computer Vision and Pattern Recognition (CVPR), 2019, pp. 8797-8806.
Tateno et al., "Distortion-aware convolutional filters for dense prediction in panoramic images," Proceedings of the European Conference on Computer Vision (ECCV), 2018, pp. 707-722.
Tu et al., "Image parsing: Unifying segmentation, detection, and recognition," International Journal of Computer Vision, Feb. 1, 2005, 63:113-140.
Voigtlaender et al., "MOTS: Multi-object tracking and segmentation," Proceedings of the IEEE/CVF Conference on Computer Vision and Pattern Recognition (CVPR), 2019, pp. 7942-7951.
Wang et al., "Axial-DeepLab: Stand-Alone Axial-Attention for Panoptic Segmentation," Computer Vision—ECCV 2020, Oct. 29, 2020, pp. 108-126.
Wang et al., "Pixel Consensus Voting for Panoptic Segmentation," Proceedings of the IEEE/CVF Conference on Computer Vision and Pattern Recognition (CVPR), 2020, pp. 9464-9473.
Weber et al., "DeepLab2: A TensorFlow Library for Deep Labeling," CoRR, Jun. 17, 2021, arXiv: 2106.09748, 7 pages.
Weber et al., "Single-shot Panoptic Segmentation," 2020 IEEE/RSJ International Conference on Intelligent Robots and Systems (IROS), Oct. 24, 2020, pp. 8476-8483.
Weber et al., "STEP: Segmenting and tracking every pixel," 35th Conference on Neural Information Processing Systems (NeurIPS 2021) Track on Datasets and Benchmark, 2021, 13 pages.
Wu et al., "Online object tracking: A benchmark," Proceedings of the IEEE Conference on Computer Vision and Pattern Recognition (CVPR), 2013, pp. 2411-2418.
Xiong et al., "UPSNet: A Unified Panoptic Segmentation Network," Proceedings of the IEEE/CVF Conference on Computer Vision and Pattern Recognition (CVPR), 2019, pp. 8818-8826.
Xu et al., "Multi-view people tracking via hierarchical trajectory composition," Proceedings of the IEEE Conference on Computer Vision and Pattern Recognition (CVPR), 2016, pp. 4256-4265.
Xu et al., "Streaming hierarchical video segmentation," Computer Vision—ECCV 2012, Oct. 7-13, 2012, pp. 626-639.
Yang et al., "Auto4D: Learning to label 4D objects from sequential point clouds," CORR, Jan. 17, 2021, arXiv:2101.06586, 8 pages.
Yang et al., "Capturing omni-range context for omnidirectional segmentation," Proceedings of the IEEE/CVF Conference on Computer Vision and Pattern Recognition (CVPR), 2021, pp. 1376-1386.
Yang et al., "DeeperLab: Single-Shot Image Parser," CoRR, Feb. 13, 2019, arXiv:1902.05093, 20 pages.

(56) References Cited

OTHER PUBLICATIONS

Yang et al., "Video Instance Segmentation," Proceedings of the IEEE/CVF International Conference on Computer Vision (ICCV), 2019, pp. 5188-5197.
Yao et al., "Describing the scene as a whole: Joint object detection, scene classification and semantic segmentation," 2012 IEEE Conference on Computer Vision and Pattern Recognition, Jun. 16-21, 2012, pp. 702-709.
Yogamani et al., "Woodscape: A multi-task, multi-camera fisheye dataset for autonomous driving," IEEE/CVF International Conference on Computer Vision (ICCV), 2019, pp. 9308-9318.
Yu et al., "BDD100k: A diverse driving dataset for heterogeneous multitask learning," Proceedings of the IEEE/CVF Conference on Computer Vision and Pattern Recognition (CVPR), 2020, pp. 2636-2645.
Zakharov et al., "Autolabeling 3D objects with differentiable rendering of SDF shape priors," Proceedings of the IEEE/CVF Conference on Computer Vision and Pattern Recognition (CVPR), 2020, pp. 12224-12233.
Zamir et al., "GMCP-tracker: Global multi-object tracking using generalized minimum clique graphs," Computer Vision—ECCV 2012, Oct. 7-13, 2012, pp. 343-356.
Zhang et al., "Orientation-aware semantic segmentation on icosahedron spheres," Proceedings of the IEEE/CVF International Conference on Computer Vision (ICCV), 2019, pp. 3533-3541.

* cited by examiner

GENERATING PANOPTIC SEGMENTATION LABELS

CROSS-REFERENCE TO RELATED APPLICATIONS

This application claims priority to U.S. Provisional Patent Application No. 63/317,534, filed on Mar. 7, 2022, the contents of which are hereby incorporated by reference.

BACKGROUND

This specification relates to processing inputs that include video frames using neural networks to generate panoptic segmentation labels.

Panoptic image segmentation is the computer vision task of identifying groups of pixels in an image and assigning semantic classes and object instance identifiers to the groups of pixels. Generating and assigning panoptic segmentation labels, i.e., labeling objects from sensor samples of an environment, can assist in motion planning, e.g., by an autonomous vehicle.

Autonomous vehicles include self-driving cars, boats, and aircraft. Autonomous vehicles use a variety of on-board sensors and computer systems to detect nearby objects and use such detections to make control and navigation decisions.

BRIEF DESCRIPTION OF THE DRAWINGS

Like reference numbers and designations in the various drawings indicate like elements.

DETAILED DESCRIPTION

Figure 1:
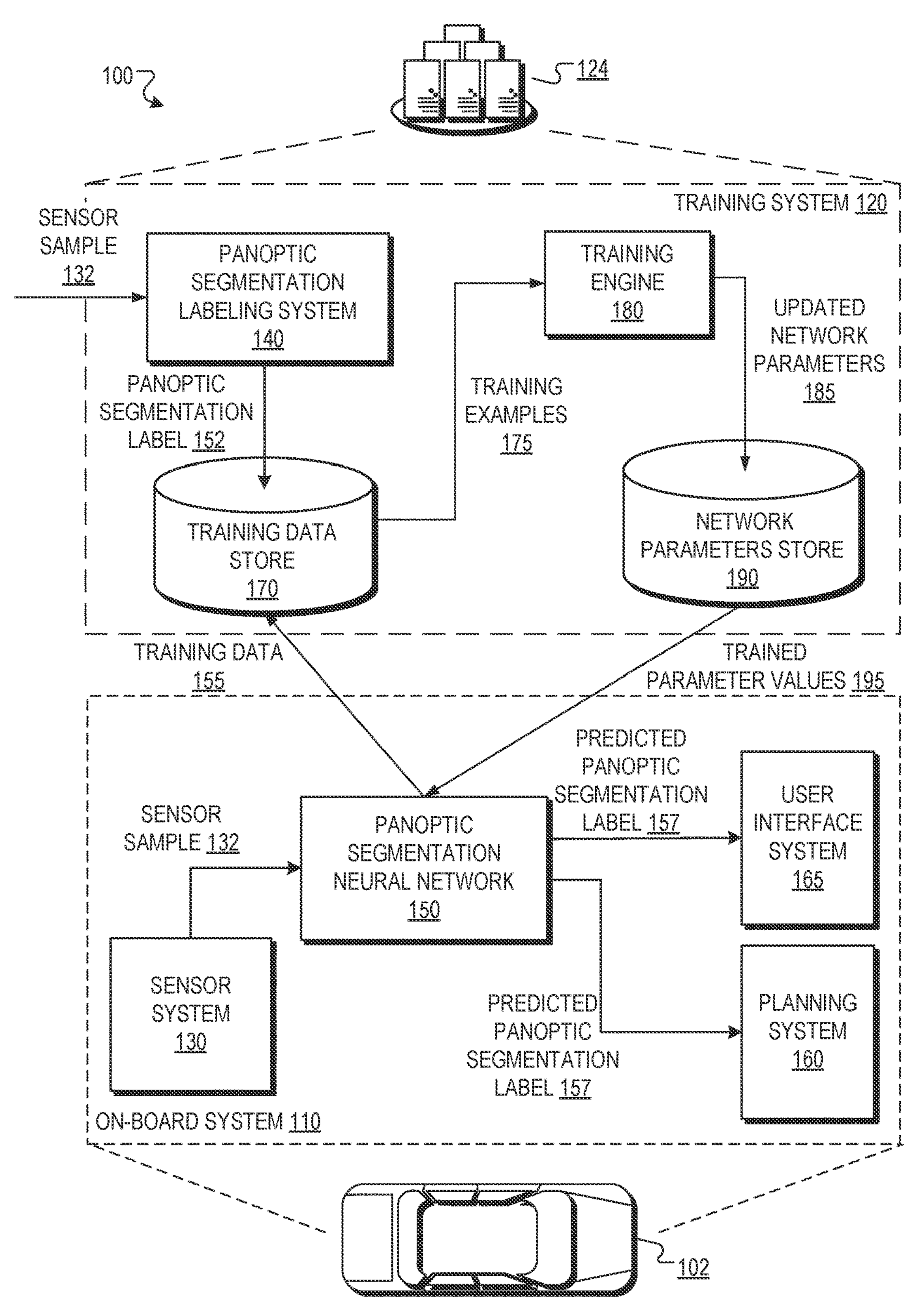
FIG. 1 is a block diagram of an example system.

This specification describes a system implemented as computer programs on one or more computers in one or more locations that generates a panoptic segmentation label for a sensor sample that includes a respective frame at each of multiple time points.

Panoptic image segmentation is a computer vision task that requires assigning semantic classes and object instance identifiers to each of multiple pixels in an image. For example, panoptic image segmentation includes training a neural network to assign a semantic class label (e.g., vehicle, human, animal etc.) and a corresponding object instance identifier to each pixel in an image. The object instance identifier is a unique identifier for an object instance that is depicted at the pixel. For example, while two pixels that depict two different pedestrians would be assigned the same semantic class label, the two pixels would be associated with different object instance identifiers because they depict two different instances of objects that correspond to the "pedestrian" or "human" class.

Some existing techniques attempt to train neural networks to perform panoptic segmentation labeling by training manually labeled data. In particular, these techniques require a set of labeled training data that includes multiple labeled training examples that include labels for every pixel in the image. Generating a large data set of such manually labeled examples can be very time consuming and expensive.

This problem is exacerbated when panoptic segmentation labels are required for a video that includes multiple video frames and even further exacerbated when multiple videos are being captured by multiple sensors. In these cases, the segmentation labels need to not only be internally consistent within each image, but also consistent across sensors and across time.

For example, autonomous vehicles can fuse and interpret data from multiple sensors to build and maintain over time accurate estimations of scenes in environments.

However, in some examples, objects of interest may leave the field of view of a camera to enter the field of view of another camera across consecutive frames. The sensor system of the autonomous vehicle may be unable to track and segment multiple moving objects across time when objects leave the field of view if the autonomous vehicle is using a neural network that has been trained to perform panoptic segmentation labeling in a way that does not ensure that the labels are consistent across time and across different sensors. This can result in inaccuracies in generating panoptic segmentation labels of objects in a scene of the environment.

Additionally, most existing panoptic segmentation datasets provide labels for individual camera images, which makes it difficult to train models that fuse information from multiple camera images that represent frames of a video. On the other hand, existing datasets that provide panoptic segmentation labels for video data tend to be scarce and much smaller than datasets for object detection and tracking for autonomous driving.

To mitigate these issues, this specification describes techniques for generating panoptic segmentation labels that are consistent across time by using sensor data from multiple camera views. For example, the system processes sensor data from cameras mounted at different locations on an autonomous vehicle. Because the cameras have different viewpoints, they each capture different portions of the scene. Thus, the system can generate a panoramic view from sensor samples of the multiple camera views, and the system can process the panoramic view to generate panoptic segmentation labels of the scene. The system can use the panoptic segmentation labels to train a panoptic segmentation neural network, which can increase the efficiency of the training and can increase the accuracy of the panoptic segmentation neural network.

The specification also describes using 3D bounding box annotation to generate the panoptic segmentation labels. In particular, the system obtains 3D bounding box annotations for a point cloud characterizing the scene at the time point. The 3D bounding box annotations are based on consistent object instance identifiers across the 3D bounding boxes and can capture the entire scene, i.e., across the fields of view of all the multiple cameras. Therefore, by leveraging the 3D bounding box annotations, the system can further improve the accuracy in labeling and tracking objects in images for panoptic segmentation.

FIG. 1 shows an example system 100. The system 100 includes an on-board system 110 and a training system 120.

The on-board system 110 is located on-board a vehicle 102. The vehicle 102 in FIG. 1 is illustrated as an automobile, but the on-board system 110 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver.

The on-board system 110 includes one or more sensor systems 130. The sensor systems 130 include one or more camera sensors that detect reflections of visible light and optionally one or more other sensors, e.g., lidar sensors that generate point clouds, radar sensors that detect reflections of radio waves, and so on.

As the vehicle 102 navigates through the environment, various sensors capture measurements of the environment. For example, a camera sensor can repeatedly capture sensor samples 132 during the navigation by capturing a video of the environment. As a particular example, the sensor system 130 can include multiple cameras located at different positions on the body of the vehicle 102 to capture the sensor samples 132 that represent a scene in the environment.

The sensor sample 132 can include multiple camera images corresponding to frames of a video of the scene at different camera views captured by multiple cameras onboard the sensor system of a vehicle, such as the sensor system 130. For example, the sensor sample 132 can include a respective camera image for a temporal sequence corresponding to each of the multiple cameras. The temporal sequence represents multiple camera images captured at multiple time points at each of the multiple cameras (e.g., captured at different frames of the video).

Once the sensor system 130 generates the sensor sample 132, the sensor system 130 can send the sensor sample 132 to a panoptic segmentation neural network 150, also onboard the vehicle 102.

The panoptic segmentation neural network 150 can process the sensor sample 132 to generate a predicted panoptic segmentation label 157. The predicted segmentation label 157 includes semantic class labels and object instance identifiers for each pixel of the camera images included in the sensor sample 132. Categories of the semantic class labels can include any of: a vehicle, a human, an animal, a building, flat structures, vegetation, sky, and so on. Generally, the class labels can include one or more classes for types of foreground or dynamic objects, e.g., vehicles, pedestrians, animals, and one or more classes for background or static objects, e.g., buildings vegetation, or sky. The object instance identifiers are unique identifiers that correspond to one or more of the object instances associated with the semantic class. For example, an object identifier can label a pixel as corresponding to a first pedestrian (e.g., pedestrian 1) and a second pixel as corresponding to a second pedestrian (e.g., pedestrian 2) in the scene.

In some implementations, the panoptic segmentation neural network 150 generates the predicted panoptic segmentation label 157 by processing multiple camera images of the scene.

In particular, in some of these implementations, the input includes a first camera image captured at a first time point of a temporal sequence and a second camera image captured at a second consecutive time point of the temporal sequence. The temporal sequence is a series of consecutive time points, and the first camera image and the second camera image correspond to the same camera view, i.e., are taken by the same camera at different time points. The panoptic segmentation neural network 150 can generate predicted panoptic segmentation labels 157 for each pixel of the first and second images.

Thus, the panoptic segmentation neural network 150 can generate object instance identifiers that are consistent across time for the same camera view. In this case, the panoptic segmentation neural network 150 can be a convolutional neural network, such as a Panoptic-DeepLab model.

In some others of these implementations, the panoptic segmentation neural network 150 can process an input that includes, at each of multiple time points, a panoramic representation of multiple camera images taken at the time point. The panoptic segmentation neural network 150 can generate the panoramic representation by combining multiple camera images for the multiple camera views at a corresponding time point, as described in further detail with reference to FIG. 2.

In particular, for multiple panoramic representations that each correspond to a time point of the temporal sequence, the panoptic segmentation neural network 150 processes the panoramic representation to generate the predicted panoptic segmentation label 157 by assigning a semantic class label and an object instance identifier to each pixel of the panoramic representation. Thus, in these implementations, the object instance identifiers are consistent across space and across consecutive time points. In this case, the panoptic segmentation neural network 150 can include one or more convolutional neural networks, such as a Panoptic-DeepLab model or a VIP-DeepLab model.

The panoptic segmentation neural network 150 can then compare the object instance identifier for each pixel for a first panoramic representation at a first point of the temporal sequence and a second panoramic representation at a second point of the temporal sequence. The panoptic segmentation neural network 150 can update the object instance identifier of the panoramic representations based on the comparison, which can ensure that the object instance identifiers for each camera image are consistent across camera views and across time.

Alternatively, the panoptic segmentation neural network 150 can generate the predicted segmentation label using both the panoramic representation and multiple camera images for each camera view at multiple time points of a temporal sequence.

At a given time point of a temporal sequence, the panoptic segmentation neural network 150 processes each camera image individually to generate a predicted panoptic segmentation label 157 for each pixel of the camera image. In some examples, the panoptic segmentation neural network 150 can also process two camera images taken at consecutive time points to generate a predicted panoptic segmentation label 157 that is consistent across time.

Additionally, the panoptic segmentation neural network 150 generates the panoramic representation from the multiple camera images.

The panoptic segmentation neural network 150 can identify pixels that overlap in multiple camera views for a same time point. The panoptic segmentation neural network 150 uses the panoramic representation to compare the object instance identifiers of the overlapping pixels for two of the camera images by mapping the object instance identifier of each pixel in the camera image to the corresponding pixel in the panoramic representation. The panoptic segmentation neural network 150 can update the object instance identifier of the camera images based on the object instance identifiers of the overlapping pixels that correspond to a pixel in the panoramic representation. For example, if a first pixel of a first camera image and a second pixel of a second camera image both correspond to a same pixel of the panoramic representation, the panoptic segmentation neural network 150 updates the object instance identifier of the first pixel or the object instance identifier of the second pixel such that the object instance identifiers are consistent for both camera images. The panoptic segmentation neural network 150 can propagate these updates to the object identifiers for all overlapping pixels between camera images, which ensures that the object instance identifiers for each camera image are consistent across camera views. In this case, the panoptic segmentation neural network 150 can include one or more convolutional neural networks, such as a Panoptic-DeepLab model or a VIP-DeepLab model.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the predicted panoptic segmentation label 157 generated by the panoptic segmentation neural network 150 to one or more other on-board systems of the vehicle 102, e.g., the planning system 160 and/or a user interface system 165.

When the planning system 160 receives the predicted panoptic segmentation label 157, the planning system 160 can use the predicted panoptic segmentation label 157 to generate planning decisions that plan a future trajectory of the vehicle, i.e., to generate a new planned vehicle path.

For example, the planning system 150 can use the predicted panoptic segmentation label 157 to predict that one or more points on a given object in the environment will intersect with a currently planned path for the vehicle 102, potentially causing a collision. In this example, the planning system 160 can generate a new planned vehicle path that avoids the potential collision and cause the vehicle 102 to follow the new planned path, e.g., by autonomously controlling the steering of the vehicle. As another example, the planning system 160 can use the predicted panoptic segmentation label 157 to perform one or more downstream tasks, e.g., object tracking, trajectory prediction, and so on, and then use the outputs of these downstream tasks to generate or update the planned vehicle path.

When the user interface system 165 receives the predicted panoptic segmentation label 157, the user interface system 165 can use the predicted panoptic segmentation label 157 to present information to the driver of the vehicle 102 to assist the driver in operating the vehicle 102 safely. The user interface system 165 can present information to the driver of the vehicle 102 by any appropriate means, for example, by an audio message transmitted through a speaker system of the vehicle 102 or by alerts displayed on a visual display system in the agent (e.g., an LCD display on the dashboard of the vehicle 102). In a particular example, the predicted panoptic segmentation label 157 may contain a prediction that indicates that a particular object will intersect the current path of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To train the panoptic neural network 150, a training system 120 can send the trained parameter values 195 to the panoptic neural network 150, i.e., the trained parameter values of the panoptic segmentation neural network 150, from a network parameters store 190 in the training system 120.

The training system 120 is typically hosted within a data center 124, which can be a distributed computing system having hundreds or thousands of computers in one or more locations.

The training system 120 receives images from vehicles operating in the real world and/or from other sources, e.g., synthetic training examples generated in simulation or training examples, such as videos, generated by sensors on other agents, e.g., robots or other moving agents. For example, the training system 120 can receive training data 155 from the vehicle 102 and one or more other agents that are in communication with the training system 120.

As a particular example, the training system 120 can include a panoptic segmentation labeling system 140. The panoptic segmentation labeling system 140 can process one or more sensor samples 132 to generate a panoptic segmentation label 152 for training of the panoptic segmentation neural network 150.

In some examples, the panoptic segmentation labeling system 140 also obtains annotation data of the camera images in the sensor sample 132. The annotation data includes object instances for objects identified in each camera image for each camera view and at each time point. In some examples, the annotation data can be generated from manual user labeling of the camera images. The annotation data includes object instance labels for each pixel of each frame. The object instance labels are labels for objects in the sensor sample 132 (e.g., person, vehicle, etc.) that are consistent within each camera image.

Optionally, the panoptic segmentation labeling system 140 processes the sensor samples 132 to generate a panoramic representation of the scene, as described in further detail with reference to FIG. 2.

The panoptic segmentation labeling system 140 also obtains 3D bounding box annotations for a point cloud characterizing the scene for multiple time points. The 3D bounding box annotations include one or more 3D bounding boxes in the point cloud and a respective object instance identifier object identified within the 3D bounding box.

In particular, the panoptic segmentation labeling system 140 processes the panoramic representation of the sensor sample 132 and the 3D bounding box annotations to generate a panoptic segmentation label 152. In some examples, the panoptic segmentation 140 processes 2D bounding box annotations to generate the panoptic segmentation label 152 in addition to, or instead of, the 3D bounding box annotations.

The panoptic segmentation labeling system 140 can then send the panoptic segmentation labels 152 to the training data store 170.

The training data 155 and the panoptic segmentation labels 152 can be processed by the training system 120 to generate a new training example 175.

The training data store 170 provides training examples 175 to a training engine 180, also hosted in the training system 120.

The training engine 180 then uses the training examples 175 to update the parameters of the neural networks, and provides the updated network parameters 185 to the network parameters store 190.

Advantageously, the training engine 180 trains the multiple neural networks of the panoptic segmentation labeling system without requiring users to manually generate panoptic segmentation labels that are consistent across time and across camera views.

Once the parameter values of the multiple neural networks have been fully trained, the training system 120 can send the trained parameter values 195 to the panoptic segmentation labeling system 150, e.g., through a wired or wireless connection.

While this specification describes that the predicted panoptic segmentation labels 157 are generated on-board an autonomous vehicle, more generally, the described techniques can be implemented on any system of one or more computers that receives images of scenes in an environment. That is, once the training system 120 has trained the panoptic segmentation labeling system 150, the trained neural networks can be used by any system of one or more computers.

As one example, the predicted panoptic segmentation labels 157 can be generated on-board a different type of agent that has a camera sensor and that interacts with objects as it navigates through an environment. For example, the predicted panoptic segmentation labels 157 can be generated by one or more computers embedded within a robot or other agent.

As another example, the predicted panoptic segmentation labels 157 can be generated by one or more computers that are remote from the agent and that receive images captured by one or more camera sensors of the agent. In some of these examples, the one or more computers can use the predicted panoptic segmentation labels 157 to generate control decisions for controlling the agent and then provide the control decisions to the agent for execution by the agent.

Figure 2:
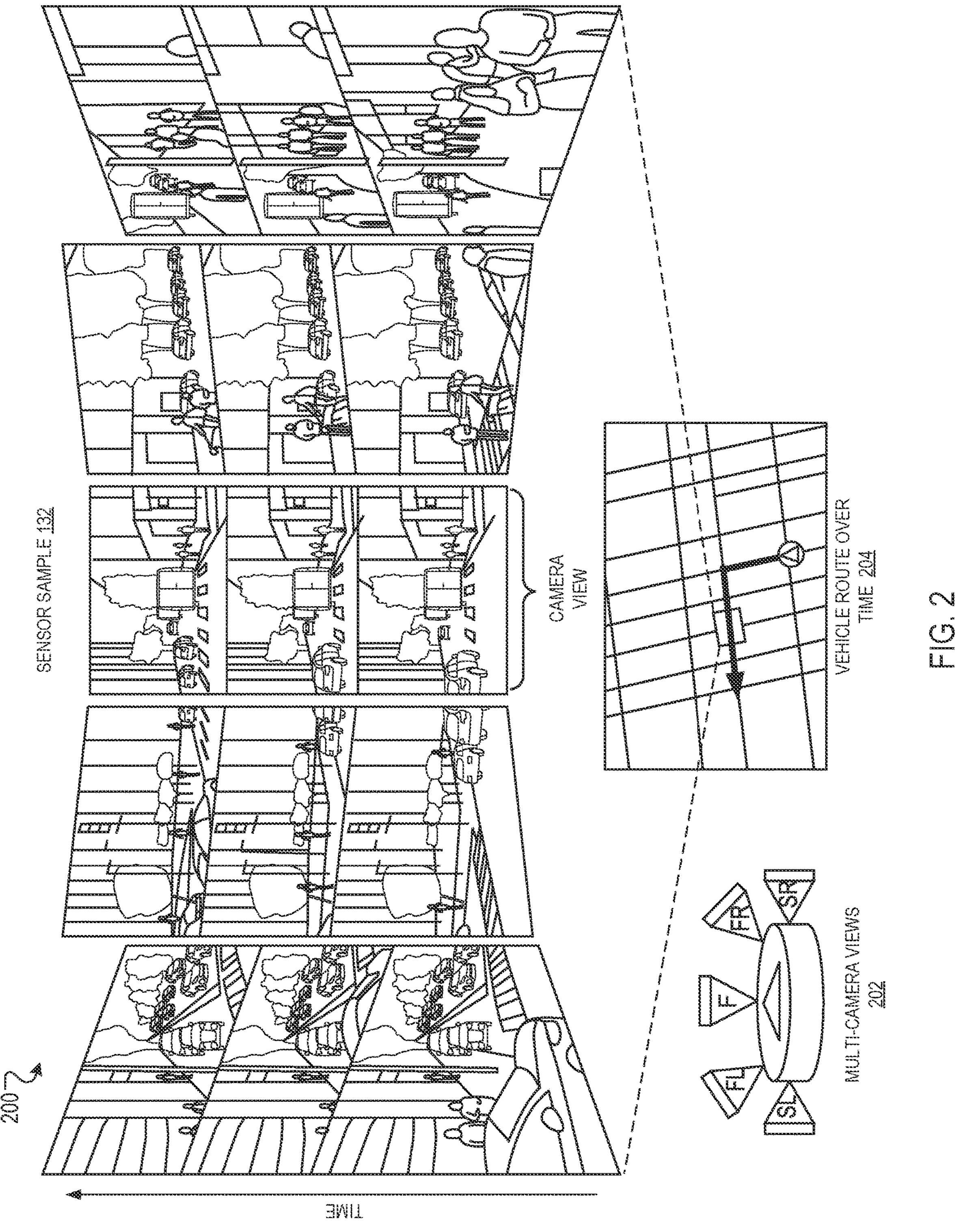
FIG. 2 is a diagram of the sensor samples processed by the panoptic segmentation labeling system.

FIG. 2 shows a diagram of the sensor sample processed by the panoptic segmentation labeling system. For convenience, the diagram 200 will be described as being processed by an on-board system of an autonomous vehicle. For example, a system, e.g., the system 100 of FIG. 1, appropriately programmed in accordance with this specification, can process the sensor sample of the diagram 200.

An autonomous vehicle can navigate through an environment by using the sensor system to capture sensor data and by using the panoptic segmentation neural network to identify properties of objects in the environment.

To train the panoptic segmentation neural network on-board the vehicle, a training system can use a panoptic segmentation labeling system to generate panoptic segmentation labels from sensor samples 132.

A sensor system on-board a vehicle can capture a sensor sample 132 using multiple cameras, where each camera is mounted at a different point of the vehicle. As such, each camera has a different camera view, and the sensor system can capture sensor samples 132 representing multiple properties of a scene in an environment with each camera. By using multiple cameras, the sensor system on-board the autonomous vehicle can increase the efficiency of processing the sensor sample 132 through pixel-level tracking and segmentation for multiple object classes.

The sensor sample 132 includes images from multiple camera angles and multiple time points of a temporal sequence.

The sensor sample 132 of diagram 200 shows camera images of different cameras from multiple camera views (e.g., multi-camera views 202). For each camera view, the sensor sample 132 includes three camera images captured at a different time point of the temporal sequence. The different time points can correspond to different time points that a vehicle traveled through a particular route (e.g., vehicle route over time 204). For example, each column of the sensor sample 132 represents a particular camera view, and each camera image of the column of the sensor sample 132 represents the scene at a different time point.

In particular, multi-camera views 202 represents five different cameras capturing camera images of the environment. Each camera is mounted at different points on the vehicle to capture a different viewpoint of the scene. In this example, the multi-camera views 202 represents camera view of cameras mounted on the side left (SL), front left (FL), front (F), front right (FR), and side right (SR) of the vehicle.

The vehicle route over time 204 shows a top-down route of the vehicle in the environment over a temporal sequence (e.g., a particular number of time points). In particular, the vehicle route over time includes a segment of the route, denoted by a box, during which the vehicle captured the camera images of the sensor sample 132. The segment of the route corresponds to multiple time points of the temporal sequence, where each time point of the temporal sequence corresponds to a frame of a video captured by the cameras. Each frame of the video includes a respective camera image of the multi-camera views. In this example, the sensor sample includes three camera images for each camera view captured at three respective time points during the segment of the route.

In some examples, the panoptic segmentation labeling system generates a panoramic representation using the sensor sample 132. The panoramic representation is an equirectangular panorama (e.g., 220° coverage of the environment) at a certain time point of the temporal sequence.

The panoptic segmentation labeling system generates the panoramic representation by stitching together the individual camera images of the sensor sample 132 for each corresponding time point of the temporal sequence.

In particular, the panoptic segmentation labeling system projects each pixel coordinate of the camera images to the 3D space. The panoptic segmentation labeling system then sets a new viewpoint (e.g., a virtual camera) at the geometric mean of each of the multiple cameras (e.g., the five camera centers). The panoptic segmentation labeling system computes the values of the pixels of the panoramic representation at the new viewpoint by performing an equirectangular projection from the 3D space. The panoptic segmentation labeling system generates the equirectangular projection from the 3D projection in the 3D space by performing bilinear sampling (e.g., bilinear interpolation) of the pixels in the 3D projection.

In some examples, pixels can correspond to (e.g., be captured in) multiple camera views. In this case, the panoptic segmentation labeling system computes the values of the pixels based on the distance of each pixel in the panoramic representation 206 to each of the boundaries of the camera views.

The panoptic segmentation labeling system then groups the camera images by camera view (e.g., SL of the multiple camera views) and each time point of the temporal sequence.

In some examples, the panoptic segmentation labeling system can obtain 3D bounding box annotations for multiple point clouds characterizing the scene at multiple time points.

The 3D bounding box annotations include one or more 3D bounding boxes in the point cloud and an object instance identifier, as described in further detail with reference to FIG. 3.

The panoptic segmentation labeling system can then generate a panoptic segmentation label for each camera view of the multi-camera views 202. The panoptic segmentation labeling system can generate the panoptic segmentation label by identifying a 3D bounding box that corresponds to the same object as the object instance included in the annotation data. The panoptic segmentation labeling system can associate the object instance identifier of the 3D bounding box with the object instance. By creating this association, the panoptic segmentation labeling system can maintain consistency among the panoptic segmentation labels based on the object instances for the sensor sample 132.

In some examples, the panoptic segmentation labeling system can use the panoptic segmentation labels corresponding to each of the camera views to generate panoptic segmentation labels for the panoramic representation 206. The panoptic segmentation labeling system can fuse the panoptic segmentation labels from each of the camera views to compute panoptic segmentation labels for the panoramic representation 206.

In some examples, the training system can train a neural network for each camera view of the multi-camera views 202 and a neural network for the panoramic representation 206 by using the panoptic segmentation labels as training inputs.

Figure 3:
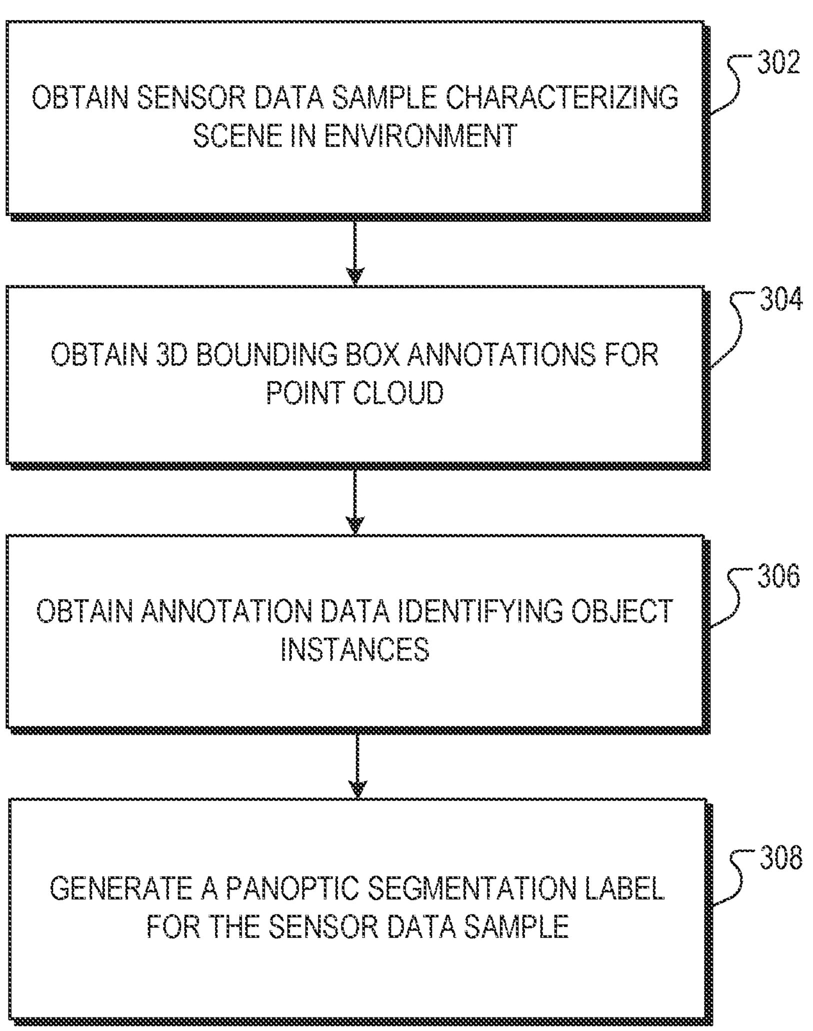
FIG. 3 is a flow diagram of an example process for generating a panoptic segmentation label.

FIG. 3 is a flow diagram of an example process 300 for generating a panoptic segmentation label. For convenience, the process 300 will be described as being performed by a system of one or more computers located in one or more locations. For example, a system, e.g., the system 100 of FIG. 1, appropriately programmed in accordance with this specification, can perform the process 300.

The system obtains a sensor data sample characterizing a scene in an environment (302). The sensor data sample includes a respective camera image of the scene at a time point of multiple time points for each of multiple cameras. The multiple cameras are located at a different viewpoint within the scene. The camera image represents a frame of a video of the environment captured by the sensor system of the autonomous vehicle.

The system groups the camera images by camera view and by time point, and the system stitches the camera images to generate the panoramic representation for each corresponding time point of the temporal sequence.

Additionally, the system obtains a 3D bounding box annotations for a point cloud characterizing the scene at each time point of the multiple time points (304). In some examples, the system can obtain the 3D bounding box annotations through manual labeling. In some other examples, the system can obtain the 3D bounding box annotations from an already trained 3D object detection neural network.

The 3D bounding box annotations include one or more 3D bounding boxes in the point cloud and a respective object instance identifier from a set of consistent object instance identifiers. Each 3D bounding box contains multiple LIDAR points of the point cloud.

The object instance identifiers are consistent across each of the 3D bounding boxes in a point cloud. The object instance identifiers correspond to objects in an environment (e.g., a person, a vehicle, etc.) The object instance identifier of the 3D bounding box corresponds to an identified object in the 3D bounding box. The set of object instance identifiers is referred to as "consistent" because the 3D bounding boxes correspond to a single point cloud, and each point cloud corresponds to a single time point. Thus, if two 3D bounding boxes at different time points are assigned the same object instance identifier, the system can determine that the 3D bounding boxes correspond to the same object.

In some examples, the system can also obtain, for each time point, 2D bounding box annotations for each camera image. The 2D bounding box annotations include one or more 2D bounding boxes in the image and a respective object instance identifier from a second set of object instance identifiers for each 2D bounding box. The second set of object instance identifiers for the 2D bounding boxes are consistent across temporal frames and independent for each camera, i.e., not required to be consistent across camera views.

The system obtains annotation data identifying object instances depicted in the camera image for each camera image and at each time point (306). In particular, the system obtains annotation data for the panoramic representation of each time point. In some examples, the system can obtain the annotation data through manual labeling.

The system then generates a panoptic segmentation label for the sensor data sample (308). The system generates the panoptic segmentation label by identifying a corresponding 3D bounding box that corresponds to the same object as the object instance for each of one or more of the objects identified in the annotation data. The system identifies the corresponding 3D bounding box for a same object in the panoramic representation of the sensor data samples. In some examples, the system can generate the panoptic segmentation label using the 2D bounding boxes, as described in more detail with reference to FIG. 4.

Figure 4:
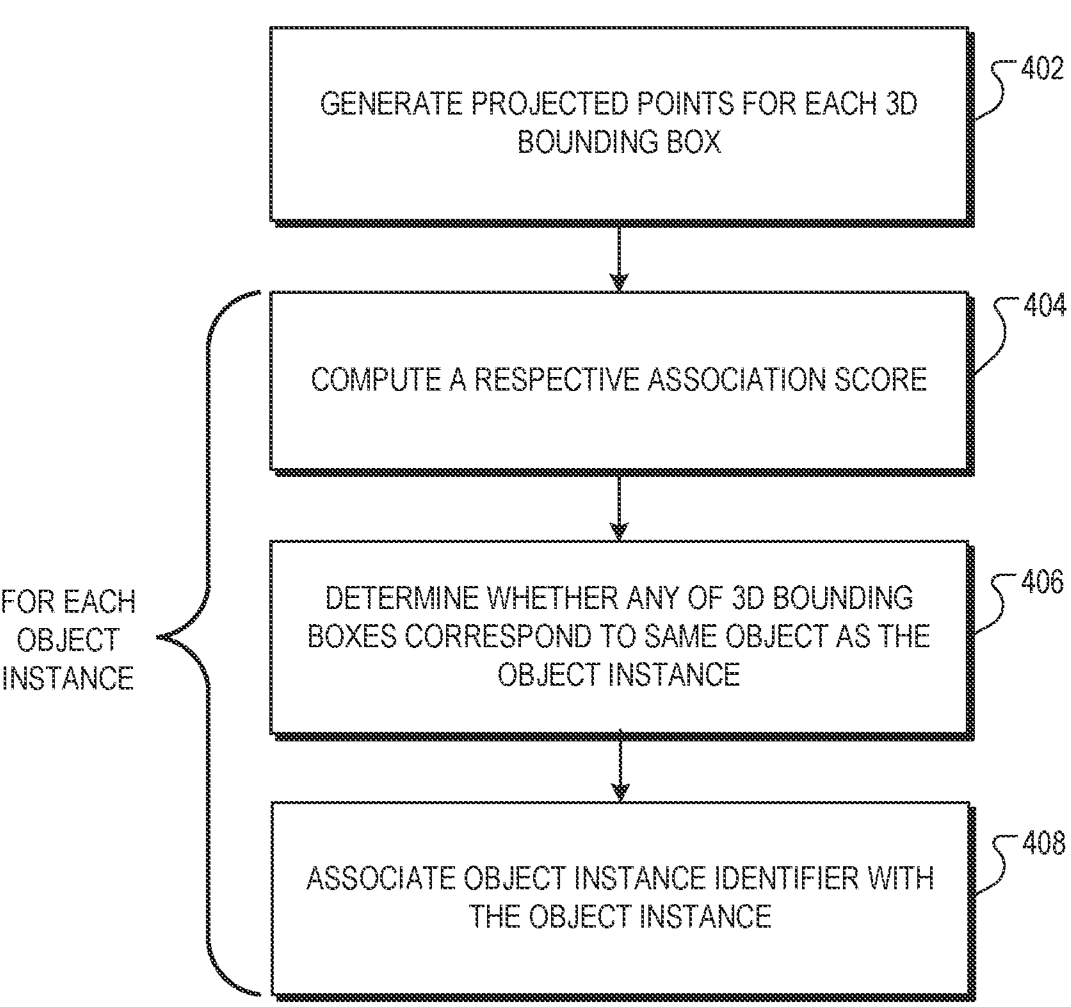
FIG. 4 is a flow diagram of an example process for identifying a 3D bounding box that corresponds to a same object as an object instance.

FIG. 4 is a flow diagram of an example process 400 for identifying a 3D bounding box that corresponds to a same object as an object instance.

For convenience, the process 400 will be described as being performed by a system of one or more computers located in one or more locations. For example, a system, e.g., the system 100 of FIG. 1, appropriately programmed in accordance with this specification, can perform the process 400.

In some examples, the system can identify a corresponding 3D bounding box that corresponds to the same object as the object instance by generating multiple projected points for each 3D bounding box (402). The system generates the multiple projected points by projecting the points (e.g., LIDAR points) within the 3D bounding box onto the camera image at the same time point as the camera image.

For each object instance in the camera image, the system computes a respective association score for the 3D bounding box (404).

In some examples, the respective association score is based on a similarity between the object instance and the projected points generated for the 3D bounding box.

In some other examples, the respective association score for each 3D bounding box is based on a similarity between the object instance and a convex hull of the projected points generated for the 3D bounding box.

The system determines whether any of the 3D bounding boxes correspond to the same object as the object instance based on the respective association scores (406). In some examples, the system determines whether any of the 3D bounding boxes correspond to the same object as the object instance by performing a bipartite matching across the object instances and the 3D bounding boxes based on the respective association scores for the pairs of object instances and 3D bounding boxes.

The system then generates the panoptic segmentation label by associating the respective object instance identifier for the corresponding 3D bounding box with the object instance (408). The system maps each of the object instances to the same object instance identifier corresponding to the multiple camera images for each of the camera views.

In some examples, the system can generate the panoptic segmentation label by identifying a corresponding 3D bounding box that corresponds to the same object as the object instance using the 3D bounding box annotations and the 2D bounding annotations. The system can then associate the respective object instance identifier with the object instance for the corresponding 3D bounding box. By creating this association, the system can still generate the panoptic segmentation label even in cases where objects of one or more camera images are not mapped to an object instance identifier of the 3D bounding boxes.

Alternatively, the system can generate the panoptic segmentation label for the sensor data sample by using only the 2D bounding box annotations to identify a corresponding 2D bounding box that corresponds to the same object as the object instance. The system can then associate the respective object instance identifier from the second set of object instance identifiers with the object instance for the corresponding 2D bounding box.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

obtaining a sensor data sample characterizing a scene in an environment, the sensor data sample comprising one or more camera images of the scene from each of a plurality of cameras that are each located at a different camera viewpoint within the scene;

obtaining respective three-dimensional (3D) bounding box annotations for one or more point clouds characterizing the scene, wherein each 3D bounding box annotation includes one or more 3D bounding boxes in the one or more point clouds, and wherein each 3D bounding box includes a plurality of LIDAR points;

generating a plurality of projected LIDAR points for each 3D bounding box that are in a camera image of the one or more camera images of the scene;

obtaining, for each camera image, annotation data identifying object instances depicted in the camera image; and generating a panoptic segmentation label for the sensor data sample characterizing the scene in the environment by modifying the annotation data for one or more of the object instances depicted in the camera image, the generating comprising:

identifying a first object depicted in a first camera image from a first camera at a first camera viewpoint within the scene;

identifying a second object depicted in a second camera image from a second camera at a second camera viewpoint within the scene, wherein the second camera viewpoint is different than the first camera viewpoint;

determining that the identified first object and the identified second object are each depicted in a respective overlapping portion that overlaps between the first camera image and the second camera image, wherein the respective overlapping portions correspond to a region of the scene that is simultaneously captured in both the first camera image and the second camera based on the first camera viewpoint and the second camera viewpoint; and based on determining that the identified first object and the identified second object correspond to a same object instance, assigning a same object instance identifier to a first set of pixels in the first camera image and to a second set of pixels in the second camera image, wherein the first set of pixels and the second set of pixels are each within the respective overlapping portion.

2. The method of claim 1, further comprising:

training a neural network configured to perform panoptic segmentation on input sensor samples on training data that includes a training example that associates the sensor sample with the panoptic segmentation label for the sensor data sample.

3. The method of claim 1, wherein modifying the annotation data for one or more of the object instances comprises, for each of the one or more object instances:

identifying, using the 3D bounding box annotations, a corresponding 3D bounding box that corresponds to the same object as the object instance.

4. The method of claim 3, wherein identifying, using the 3D bounding box annotations, a corresponding 3D bounding box that corresponds to the same object as the object instance comprises, for each camera image:

for each 3D bounding box in a corresponding point cloud that was generated at a same time point as the camera image, generating a plurality of projected points by projecting the points within the 3D bounding box onto the camera image;

for each object instance detected in the camera image:

computing a respective association score for each 3D bounding box based on a similarity between the object instance and the projected points generated for the 3D bounding box; and determining whether any of the 3D bounding boxes correspond to the same object as the object instance based on the respective association scores.

5. The method of claim 4, wherein the respective association score for each 3D bounding box is based on a similarity between the object instance and a convex hull of the projected points generated for the 3D bounding box.

6. The method of claim 4, wherein determining whether any of the 3D bounding boxes correspond to the same object as the object instance based on the respective association scores comprises:

performing a bipartite matching across the object instances and the 3D bounding boxes based on the respective association scores for the object instance-3D bounding box pairs.

7. The method of claim 1, further comprising:

obtaining, for each camera image, 2D bounding box annotations for the image, the 2D bounding box annotations comprising (i) one or more 2D bounding boxes in the image and (ii) a respective object instance identifier from a second set of object instance identifiers for each 2D bounding box identifying an object depicted within the 2D bounding box.

8. The method of claim 7, wherein generating the panoptic segmentation label for the sensor data sample characterizing the scene in the environment further comprises:

for each of one or more of the object instances identified in the annotation data for the camera images:

identifying, using the 3D bounding box annotations and the 2D bounding box annotations, a corresponding 3D bounding box that corresponds to the same object as the object instance; and associating, with the object instance, the respective object instance identifier for the corresponding 3D bounding box.

9. The method of claim 7, wherein generating the panoptic segmentation label for the sensor data sample characterizing the scene in the environment further comprises:

for each of one or more of the object instances identified in the annotation data for the camera images:

identifying, using the 2D bounding box annotations, a corresponding 2D bounding box that corresponds to the same object as the object instance; and associating, with the object instance, the respective object instance identifier for the corresponding 2D bounding box.

10. A system comprising one or more computers and one or more storage devices storing instructions that when executed by one or more computers cause the one more computers to perform operations comprising:

obtaining a sensor data sample characterizing a scene in an environment, the sensor data sample comprising one or more camera images of the scene from each of a plurality of cameras that are each located at a different camera viewpoint within the scene;

obtaining respective three-dimensional (3D) bounding box annotations for one or more point clouds characterizing the scene, wherein each 3D bounding box annotation includes one or more 3D bounding boxes in the one or more point clouds, and wherein each 3D bounding box includes a plurality of LIDAR points;

generating a plurality of projected LIDAR points for each 3D bounding box that are in a camera image of the one or more camera images of the scene;

obtaining, for each camera image, annotation data identifying object instances depicted in the camera image; and generating a panoptic segmentation label for the sensor data sample characterizing the scene in the environment by modifying the annotation data for one or more of the object instances depicted in the camera image, the generating comprising:

identifying a first object depicted in a first camera image from a first camera at a first camera viewpoint within the scene;

identifying a second object depicted in a second camera image from a second camera at a second camera viewpoint within the scene, wherein the second camera viewpoint is different than the first camera viewpoint;

determining that the identified first object and the identified second object are each depicted in a respective overlapping portion that overlaps between the first camera image and the second camera image, wherein the overlapping portions correspond to a region of the scene that is simultaneously captured in both the first camera image and the second camera based on the first camera viewpoint and the second camera viewpoint; and based on determining that the identified first object and the identified second object correspond to a same object instance, assigning a same object instance identifier to a first set of pixels in the first camera image and to a second set of pixels in the second camera image, wherein the first set of pixels and the second set of pixels are each within the respective overlapping portion.

11. The system of claim 10, the operations further comprising:

training a neural network configured to perform panoptic segmentation on input sensor samples on training data that includes a training example that associates the sensor sample with the panoptic segmentation label for the sensor data sample.

12. The system of claim 10, wherein modifying the annotation data for one or more of the object instances comprises, for each of the one or more object instances:

identifying, using the 3D bounding box annotations, a corresponding 3D bounding box that corresponds to the same object as the object instance.

13. The system of claim 12, wherein identifying, using the 3D bounding box annotations, a corresponding 3D bounding box that corresponds to the same object as the object instance comprises, for each camera image:

for each 3D bounding box in a corresponding point cloud that was generated at a same time point as the camera image, generating a plurality of projected points by projecting the points within the 3D bounding box onto the camera image;

for each object instance detected in the camera image:

computing a respective association score for each 3D bounding box based on a similarity between the object instance and the projected points generated for the 3D bounding box; and determining whether any of the 3D bounding boxes correspond to the same object as the object instance based on the respective association scores.

14. The system of claim 13, wherein the respective association score for each 3D bounding box is based on a similarity between the object instance and a convex hull of the projected points generated for the 3D bounding box.

15. The system of claim 13, wherein determining whether any of the 3D bounding boxes correspond to the same object as the object instance based on the respective association scores comprises:

performing a bipartite matching across the object instances and the 3D bounding boxes based on the respective association scores for the object instance-3D bounding box pairs.

16. The system of claim 10, the operations further comprising:

obtaining, for each camera image, 2D bounding box annotations for the image, the 2D bounding box annotations comprising (i) one or more 2D bounding boxes in the image and (ii) a respective object instance identifier from a second set of object instance identifiers for each 2D bounding box identifying an object depicted within the 2D bounding box.

17. The system of claim 16, wherein generating the panoptic segmentation label for the sensor data sample characterizing the scene in the environment further comprises:

for each of one or more of the object instances identified in the annotation data for the camera images:

identifying, using the 3D bounding box annotations and the 2D bounding annotations, a corresponding 3D bounding box that corresponds to the same object as the object instance; and associating, with the object instance, the respective object instance identifier for the corresponding 3D bounding box.

18. The system of claim 16, wherein generating the panoptic segmentation label for the sensor data sample characterizing the scene in the environment further comprises:

for each of one or more of the object instances identified in the annotation data for the camera images:

identifying, using the 2D bounding box annotations, a corresponding 2D bounding box that corresponds to the same object as the object instance; and associating, with the object instance, the respective object instance identifier for the corresponding 2D bounding box.

19. One or more non-transitory computer-readable storage media storing instructions that when executed by one or more computers cause the one more computers to perform operations comprising:

obtaining a sensor data sample characterizing a scene in an environment, the sensor data sample comprising one or more camera images of the scene from each of a plurality of cameras that are each located at a different camera viewpoint within the scene;

obtaining respective three-dimensional (3D) bounding box annotations for one or more point clouds characterizing the scene, wherein each 3D bounding box annotation includes one or more 3D bounding boxes in the one or more point clouds, and wherein each 3D bounding box includes a plurality of LIDAR points;

generating a plurality of projected LIDAR points for each 3D bounding box that are in a camera image of the one or more camera images of the scene;

obtaining, for each camera image, annotation data identifying object instances depicted in the camera image; and generating a panoptic segmentation label for the sensor data sample characterizing the scene in the environment by modifying the annotation data for one or more of the object instances depicted in the camera image, the generating comprising:

identifying a first object depicted in a first camera image from a first camera at a first camera viewpoint within the scene;

identifying a second object depicted in a second camera image from a second camera at a second camera viewpoint within the scene, wherein the second camera viewpoint is different than the first camera viewpoint;

determining that the identified first object and the identified second object are each depicted in a respective overlapping portion that overlap between the first camera image and the second camera image, wherein the respective overlapping portions correspond to a region of the scene that is simultaneously captured in both the first camera image and the second camera based on the first camera viewpoint and the second camera viewpoint; and based on determining that the identified first object and the identified second object correspond to a same object instance, assigning a same object instance identifier to a first set of pixels in the first camera image and to a second set of pixels in the second camera image, wherein the first set of pixels and the second set of pixels are each within the respective overlapping portion.

20. The non-transitory computer-readable storage media of claim 19, the operations further comprising:

training a neural network configured to perform panoptic segmentation on input sensor samples on training data that includes a training example that associates the sensor sample with the panoptic segmentation label for the sensor data sample.

* * * * *